(12) United States Patent
Thaveeprungsriporn et al.

(10) Patent No.: US 7,296,335 B1
(45) Date of Patent: Nov. 20, 2007

(54) METHOD OF DETACHING OF MAGNETIC HEAD SLIDER FROM HEAD GIMBAL ASSEMBLY

(75) Inventors: Visit Thaveeprungsriporn, Bangkok (TH); Szu-Han Hu, Bangkok (TH)

(73) Assignee: Magnecomp Corporation, Temecula, CA (US)

( * ) Notice: Subject to any disclaimer, the term of this patent is extended or adjusted under 35 U.S.C. 154(b) by 304 days.

(21) Appl. No.: 11/142,508

(22) Filed: May 31, 2005

Related U.S. Application Data

(60) Provisional application No. 60/592,531, filed on Jul. 29, 2004.

(51) Int. Cl.
*G11B 5/48* (2006.01)
*B23K 1/06* (2006.01)

(52) U.S. Cl. .............. 29/603.02; 29/603.03; 29/603.04; 29/426.5; 29/762; 228/110.1; 228/191; 156/73.3; 156/73.6; 360/234.6; 360/234.7; 360/245.4

(58) Field of Classification Search ............. 29/603.02, 29/603.01, 603.03, 603.04, 603.06, 603.17, 29/762, 426.1, 426.4, 426.5, 402.03; 228/110.1, 228/191; 156/73.3, 73.6; 360/234.6, 234.7, 360/245.4
See application file for complete search history.

(56) References Cited

U.S. PATENT DOCUMENTS

| | | | |
|---|---|---|---|
| 5,782,403 A | * | 7/1998 | Wang ................. 29/762 X |
| 6,518,230 B2 | | 2/2003 | Wu et al. |
| 6,829,818 B2 | * | 12/2004 | Kamigama et al. .. 29/603.02 X |
| 2002/0029461 A1 | | 3/2002 | Kamigama et al. |
| 2003/0005564 A1 | | 1/2003 | Wong et al. |

FOREIGN PATENT DOCUMENTS

JP 11-312373 * 11/1999

* cited by examiner

*Primary Examiner*—A. Dexter Tugbang
(74) *Attorney, Agent, or Firm*—Intellectual Property Law Office of Joel D. Voelzke

(57) ABSTRACT

A method is provided for reworking a head gimbal assembly (HGA). An ultrasonic probe is used to stress the connection between the slider component of an HGA to remove the slider from its mounting position.

20 Claims, 4 Drawing Sheets

METHOD OF DETACHING OF MAGNETIC HEAD SLIDER FROM HEAD GIMBAL ASSEMBLY

CROSS-REFERENCES TO RELATED APPLICATIONS

This application claims the benefit of U.S. Provisional Application No. 60/592,531, filed Jul. 29, 2004, which disclosure is incorporated reference in its entirety for all purposes.

BACKGROUND OF THE INVENTION

The present invention generally relates to techniques for manufacturing hard disk drives. More particularly, the invention provides a method and system for repairing a magnetic head slider for a head gimbal assembly using an ultrasonic source. Other sources may also be used.

A hard disk drive (HDD) for data storage adapts a magnetoresistive thin film element (MR Head) to perform data read/write operations. The MR Head is bonded onto a flexure gimbal and then connected to a flex circuit using solder or gold ball bonding for data transmission. A suspension provides a platform for this architecture forming a Head Gimbal Assembly, HGA, as shown in FIG. 4.

During the manufacture of an HGA, if it is determined that the electrical property of the magnetic head slider is unacceptable, it is desirable to remove the magnetic head slider and salvage the suspension to minimize material loss. As the areal density of a hard disk drive increases, the magnetic head slider is also reduced in its size from nano- (50%), to pico- (30%), and to femto- (20%) scale dimensions, the detaching process of magnetic head slider becomes an increasingly difficult challenge. In a prior art technique, mechanical cutting using a cutter blade was suggested if gold ball bonding was used. For solder ball bonding, the detachment may employ the use of heat to melt the solder and removal by vacuum suction. As the size of the magnetic head slider gets smaller and the gimbal stiffness continues to decrease, there is a need for less contact and less intrusive techniques to detach a magnetic head slider.

From the above, it is seen that an improved technique for manufacturing a hard disk drive is highly desirable.

BRIEF SUMMARY OF THE INVENTION

A method for reworking a head gimbal assembly (HGA) according to the present invention includes positioning a probe in contact with or near to a slider component that is connected to a gimbal. An ultrasonic excitation is applied to the probe to create a reciprocating action. The reciprocating action creates mechanical stress in the connection between the slider and the gimbal to which the slider is mechanically mounted. The slider is thereby detached from the HGA.

BRIEF DESCRIPTION OF THE DRAWINGS

Various additional objects, features and advantages of the present invention can be more fully appreciated with reference to the detailed description and accompanying drawing, wherein.

DETAILED DESCRIPTION OF THE INVENTION

Figure 1A:
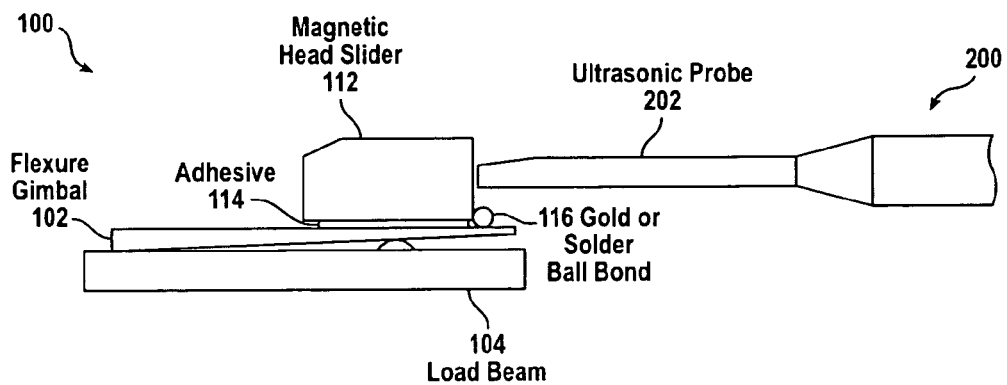
FIGS. 1A-1C show a simplified illustration of a method for detaching a magnetic head slider according to an embodiment of the present invention.
Figure 1B:
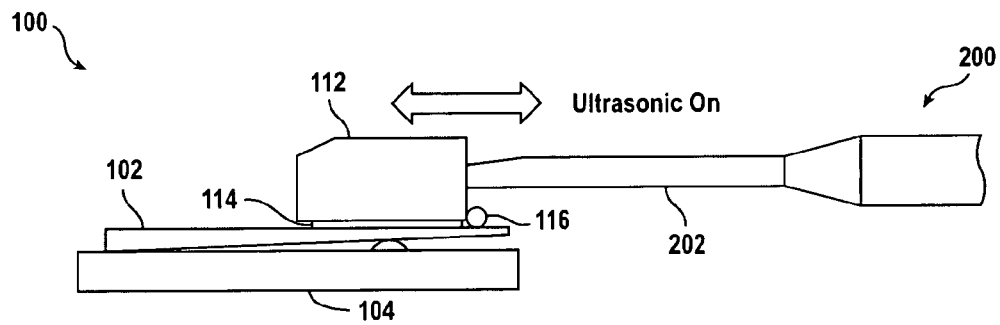
Figure 1C:
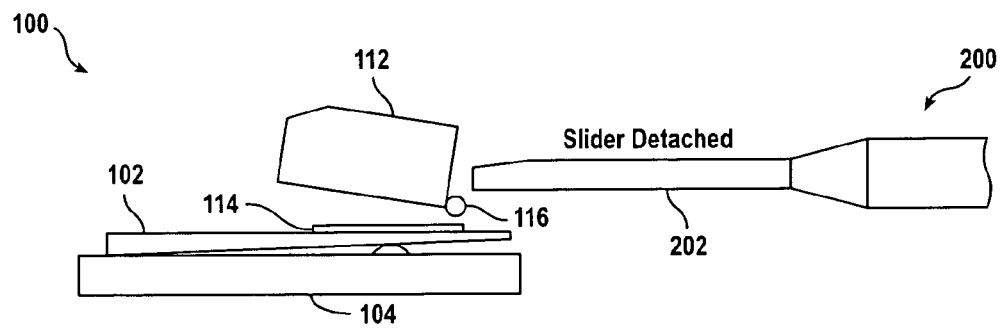

With reference to FIGS. 1A-1C, a specific embodiment of the present invention illustrates a method for reworking a head gimbal assembly for disk drive applications. The method includes holding (e.g., via a support member) a head gimbal assembly (HGA) 100 comprising a magnetic head slider 112, which is physically attached to a portion of the head gimbal assembly 100. Preferably, the magnetic head slider 112 is maintained on the support member by an adhesive material 114. A gold, or solder, ball bond 116 provides an electrical connection to a gimbal 102. Thus, in FIG. 1A, the method according to the specific embodiment of the present invention includes contacting a probe member 202 coupled to an ultrasonic transducer unit 200 to a portion of the magnetic head slider 112.

As shown in FIG. 1B, the method applies a predetermined power from the ultrasonic transducer 200 to the probe member 202 such that the probe member 202 oscillates at a frequency greater than about 1 k Hz in a linear motion having a spatial displacement of less than 0.03 mm as the probe member 202 is in contact within a vicinity of the portion of the magnetic head slider 100. The method includes causing a repetitive pushing action upon the magnetic head slider 112 using the oscillation of the probe member 202 while applying the predetermined power from the ultrasonic transducer 200 to the probe member 202.

Figure 4:
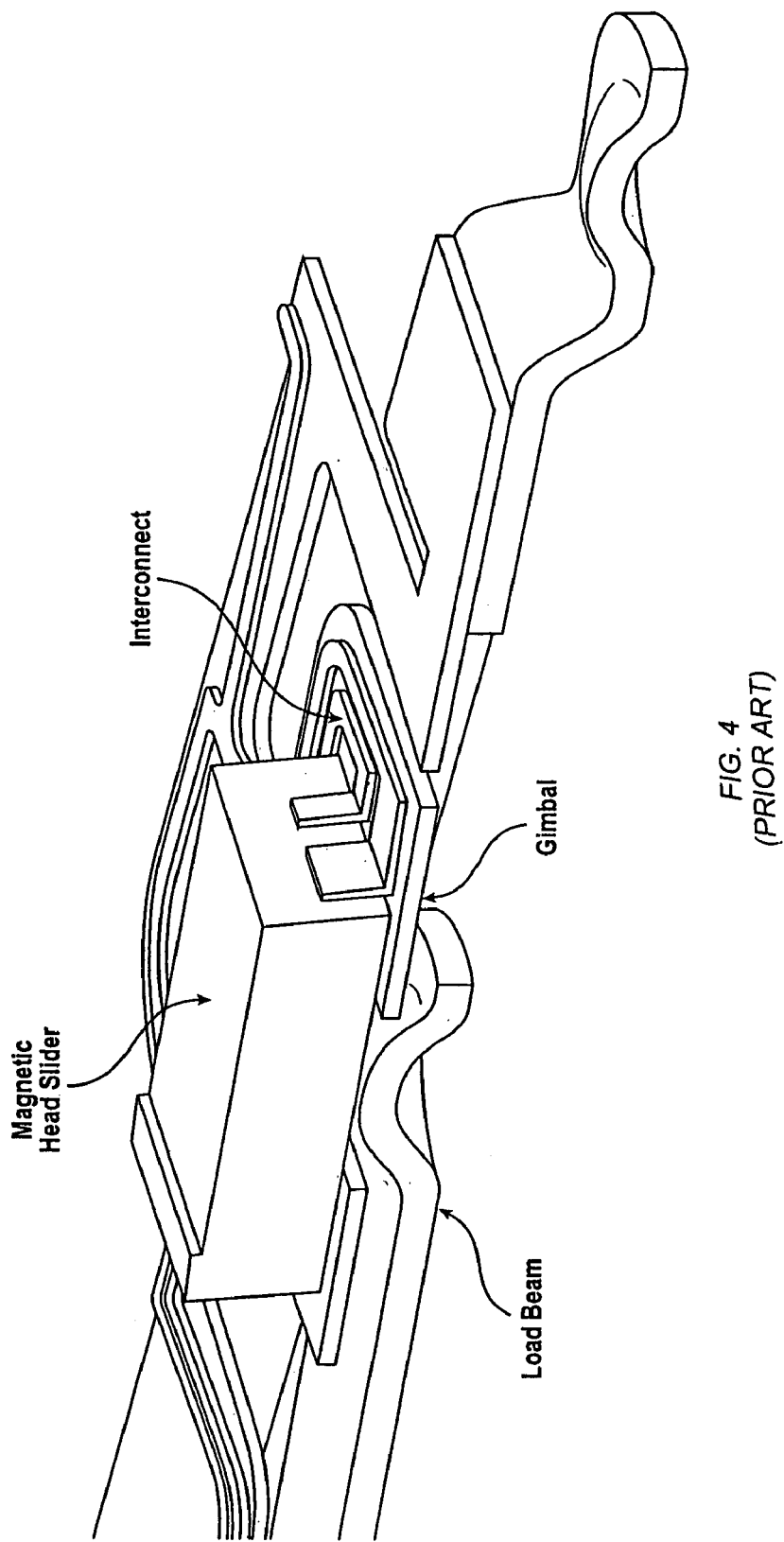
FIG. 4 is a simplified cross-sectional view of a Head Gimbal Assembly (HGA).

Referring for a moment to FIG. 4, the probe member 202 can be arranged in a parallel relation to the trace interconnect to which the magnetic head slider 112 is in electrical contact. Since the magnetic head slider 112 is typically mounted in a substantially parallel relation to the trace interconnect, the pushing action of the probe member 202 is maximally delivered to overcome the adhesion force of the adhesive 114.

Referring to FIG. 1C, the pushing action will cause separation of the magnetic head slider 112 from the head gimbal assembly 100. The method includes removing the predetermined power from the ultrasonic transducer 200.

In accordance with an aspect of the present invention, the probe member 202 is maintained at a temperature ranging from about 20° C. to about 60° C. during the operation.

The detachment employs high frequency ultrasonic transducer 200 providing linear motion with a spatial displacement in the order of less than 30 micrometers. By bringing the probe member 202 of the transducer 200 to come into contact or near contact (see FIGS. 3A-3D) with the magnetic head slider 112, the probe can move the magnetic head slider in a back and forth motion with a small displacement at a high frequency in the order of thousands of times per second. This small movement at high frequency creates a significant strain energy which can break away the ball bond 116 and the adhesive 114 underneath.

Figure 2A:
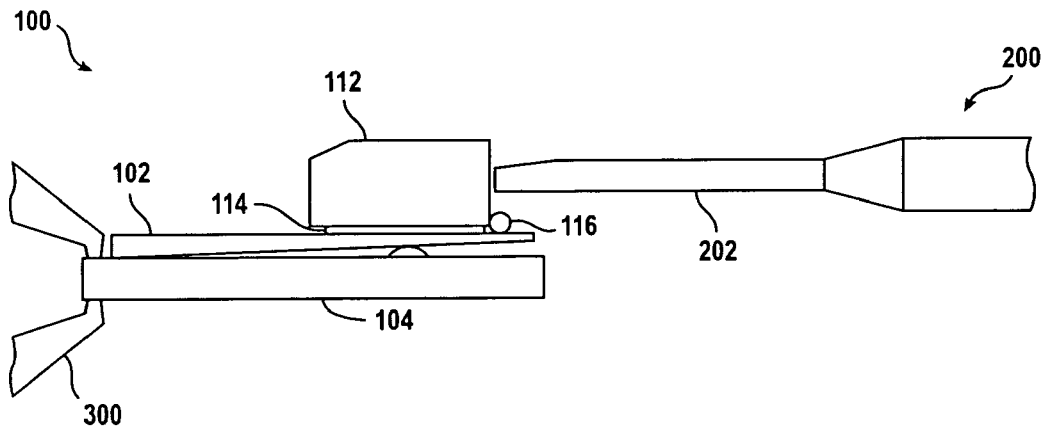
FIGS. 2A-2C show a simplified illustration of a method for detaching a magnetic head slider according to another embodiment of the present invention.
Figure 2B:
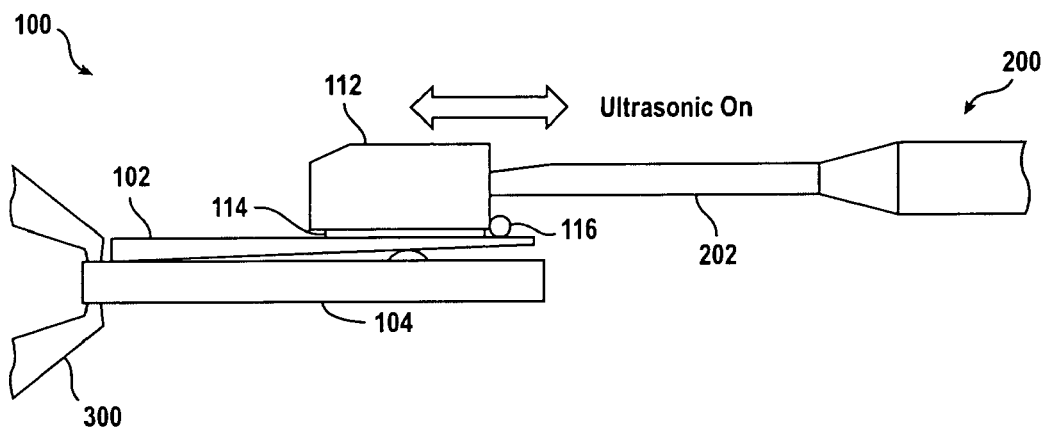
Figure 2C:
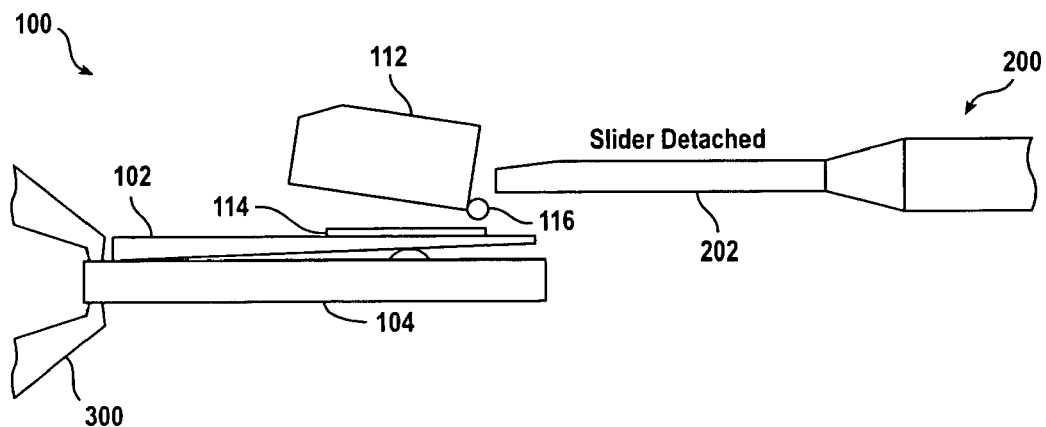

With reference to FIGS. 2A-2C, another specific embodiment of the present invention is shown of a method for reworking a head gimbal assembly for disk drive applications. The method includes a support member 300 schematically represented in the figure as an object that resembles a clamp, but which will be understood to represent any suitable support/holding structure for performing the described operation. The support member 300 supports the head gimbal assembly (HGA) 100. As shown in FIGS. 1A-1C, the HGA 100 includes the magnetic head slider 112 which is physically attached to a portion of the head gimbal assembly via the adhesive 114. Preferably, the magnetic head slider 112 is also supported on the support member 300. The method includes contacting the probe member 202 of the ultrasonic transducer 200 to a portion of the magnetic head slider 112.

As shown in FIG. 2B, the method applies a predetermined power from the ultrasonic transducer 200 to the probe member 202 such that the probe member oscillates at a frequency greater than a predetermined frequency. The range of motion of oscillation of the probe member 202 has a spatial displacement of less than a predetermined distance as the probe member is in contact within a vicinity of the portion of the magnetic head slider 112 that is being supported via the support member 300.

As can be seen in FIG. 2C, the method includes a repetitive pushing action against the magnetic head slider 112 using the oscillation of the probe member 202 while applying the predetermined power from the ultrasonic transducer 200 to the probe member. The repeated pushing action overcomes the adhesion force of the adhesive 114 and causes separation of the magnetic head slider 112 from the head gimbal assembly 100. The method includes removing the predetermined power from the ultrasonic transducer.

Figure 3A:
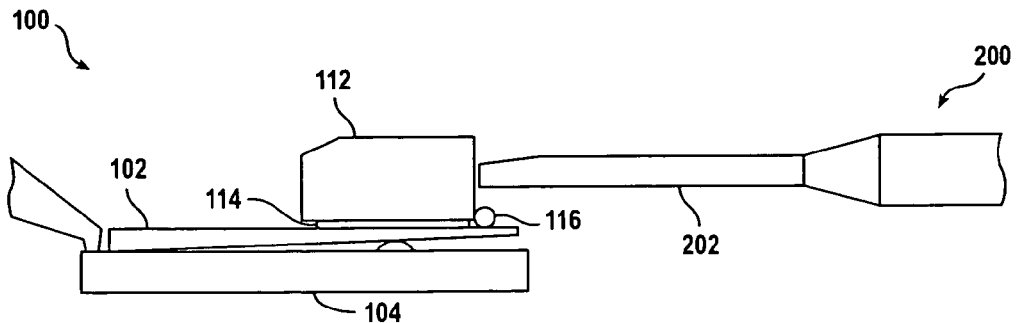
FIGS. 3A-3D show a simplified illustration of a method for detaching a magnetic head slider according to still another embodiment of the present invention.
Figure 3B:
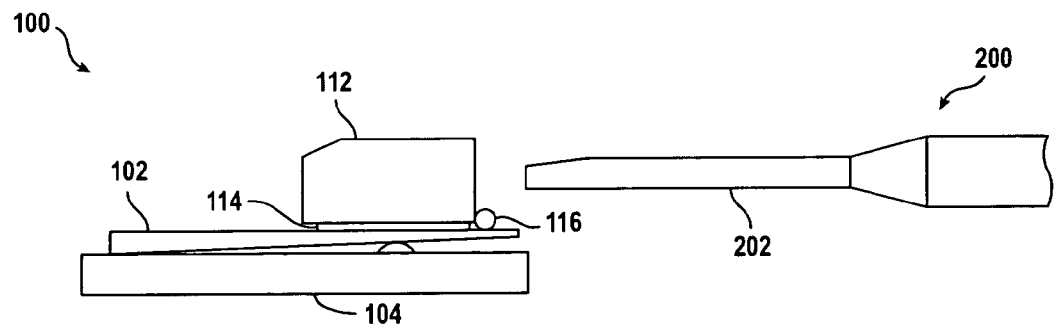

With reference to FIGS. 3A-3D, yet another specific embodiment of the present invention is shown of a method for reworking a head gimbal assembly for disk drive applications. The method includes holding (e.g., via a support member such as illustrated in FIGS. 2A-2C) the HGA 100. As shown in FIGS. 1A-1C and in FIGS. 2A-2C, the HGA 100 includes the magnetic head slider 112 which is physically attached to a portion of the head gimbal assembly via the adhesive 114. As shown in FIG. 3A, the method includes contacting the probe member 202 of the ultrasonic transducer 200 to a portion of the magnetic head slider 112. Alternatively, the probe member 202 can be brought near to the slider 112. This arrangement is shown in FIG. 3B.

Figure 3C:
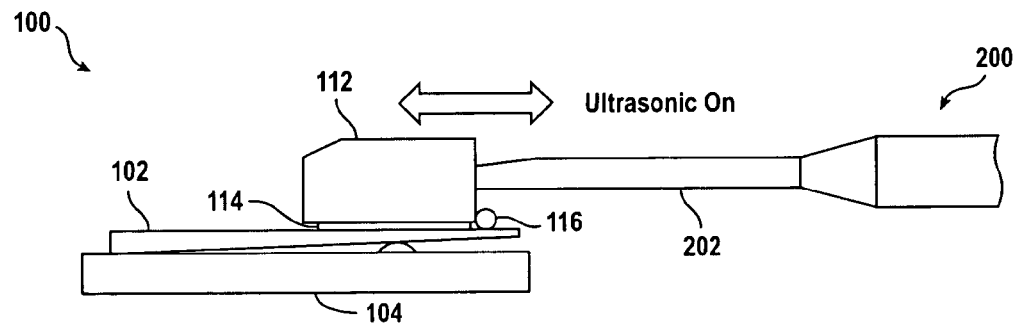
Figure 3D:
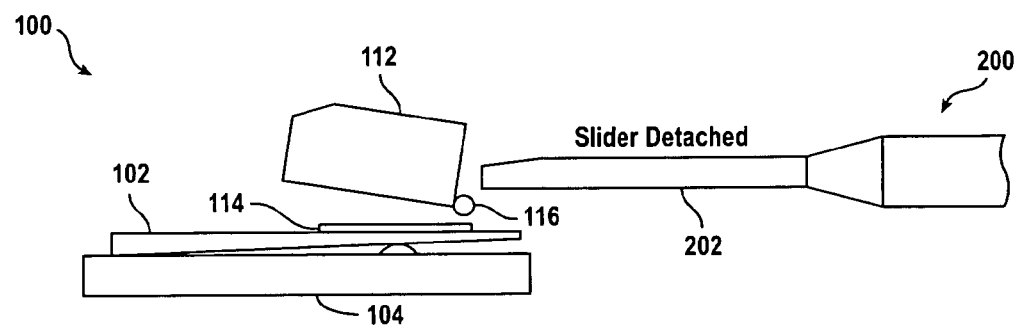

In FIG. 3C, the method applies a predetermined power from the ultrasonic transducer 200 to the probe member 202 such that the probe member oscillates at a frequency greater than a predetermined frequency. The range of motion of oscillation of the probe member 202 has a spatial displacement of less than a predetermined distance so that the probe member 202 alternates between contacting and not-contacting the magnetic head slider 112 as the probe member reciprocates back and forth against the magnetic head slider.

As can be seen in FIG. 3C, the oscillations cause repetitive pushing action against the magnetic head slider 112 using the oscillation of the probe member 202 while applying the predetermined power from the ultrasonic transducer 200 to the probe member. The repeated pushing action overcomes the adhesion force of the adhesive 114 and causes separation of the magnetic head slider 112 from the head gimbal assembly 100. The method includes removing the predetermined power from the ultrasonic transducer.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for reworking a head gimbal assembly for disk drive applications, the method comprising:
holding a head gimbal assembly comprising a magnetic head slider, the magnetic head slider being physically attached to a portion of the head gimbal assembly;
contacting a probe member, coupled to an ultrasonic transducer, to a portion of the magnetic head slider;
applying a predetermined power from the ultrasonic transducer to the probe member such that the probe member oscillates at a frequency greater than about 1 k Hz in a linear motion having a spatial displacement of less than 0.03 mm as the probe member is in contact within the portion of the magnetic head slider;
causing a repetitive pushing action using the oscillation of the probe member to the magnetic head slider while applying the predetermined power from the ultrasonic transducer to the probe member;
separating the magnetic head slider from the head gimbal assembly; and
removing the predetermined power from the ultrasonic transducer.

2. The method of claim 1 wherein the portion of the magnetic head slider is a bonding ball structure coupled between the magnetic head slider and the head gimbal assembly.

3. The method of claim 2 wherein the probe member is arranged in a perpendicular relation to the bonding ball structure.

4. The method of claim 1 wherein the probe member is provided arranged in a perpendicular relation to against the magnetic head slider.

5. The method of claim 1 wherein the bonding ball structure comprises solder material.

6. The method of claim 1 wherein the portion of the magnetic head slider is a trailing edge of the magnetic head slider.

7. The method of claim 1 wherein the portion of the magnetic head slider is a leading edge of the magnetic head slider.

8. The method of claim 1 wherein the contacting of the probe member is directly contacting the probe member to the portion of the magnetic head slider.

9. The method of claim 1 wherein the portion of the magnetic head slider is a gold ball portion.

10. The method of claim 1 wherein the separating of the magnetic head slider is free from any suction process.

11. The method of claim 1 wherein the linear motion is parallel to a direction of the magnetic head slider.

12. The method of claim 1 wherein the portion of the magnetic head slider is free from a bonding ball.

13. The method of claim 1 wherein the probe member is maintained at a temperature ranging from about 20° C. to about 60° C.

14. The method of claim 1 wherein the separating of the magnetic head slider comprises moving the probe member powered by the ultrasonic transducer to come into contact with the magnetic head slider along a direction parallel to an interconnect bond pad.

15. A method for reworking a head gimbal assembly for disk drive applications, the method comprising:
holding on a support member a head gimbal assembly comprising a magnetic head slider, the magnetic head slider being physically attached to a portion of the head gimbal assembly, the magnetic head slider being maintained on the support member;
contacting a probe member, coupled to an ultrasonic transducer, to a portion of the magnetic head slider;
applying a predetermined power from the ultrasonic transducer to the probe member such that the probe member oscillates at a frequency greater than about a predetermined frequency in a motion having a predetermined spatial displacement as the probe member is in contact within a the portion of the magnetic head slider;

causing a repetitive pushing action using the oscillation of the probe member to the magnetic head slider while applying the predetermined power from the ultrasonic transducer to the probe member; and separating the magnetic head slider from the head gimbal assembly.

16. The method of claim 15 wherein the probe member is arranged in a perpendicular relation to against the magnetic head slider.

17. The method of claim 15 wherein the predetermined frequency is greater than about 1 k Hz in a linear motion.

18. The method of claim 15 wherein the predetermined spatial displacement is about 0.03 mm.

19. The method of claim 15 wherein the linear motion is along a direction substantially parallel to an interconnect bond pad.

20. The method of claim 15 wherein the probe member is maintained at a temperature ranging from about 20° C. to about 60° C.

* * * * *

UNITED STATES PATENT AND TRADEMARK OFFICE
CERTIFICATE OF CORRECTION

PATENT NO. : 7,296,335 B1
APPLICATION NO. : 11/142508
DATED : November 20, 2007
INVENTOR(S) : Visit Thaveeprungsriporn et al.

It is certified that error appears in the above-identified patent and that said Letters Patent is hereby corrected as shown below:

In claim 4, Col. 4 line 28, delete "provided".

Signed and Sealed this

Fifteenth Day of April, 2008

JON W. DUDAS
*Director of the United States Patent and Trademark Office*